July 8, 1952 G. H. BROWN 2,602,887

RADIO TRANSMITTER

Filed Oct. 4, 1948 4 Sheets-Sheet 1

INVENTOR
GEORGE H. BROWN
BY Harry Tonick
ATTORNEY

July 8, 1952 G. H. BROWN 2,602,887

RADIO TRANSMITTER

Filed Oct. 4, 1948 4 Sheets-Sheet 2

INVENTOR
GEORGE H. BROWN
BY [signature]
ATTORNEY

INVENTOR
GEORGE H. BROWN
BY [signature]
ATTORNEY

July 8, 1952 G. H. BROWN 2,602,887

RADIO TRANSMITTER

Filed Oct. 4, 1948 4 Sheets-Sheet 4

INVENTOR
GEORGE H. BROWN
BY [signature]
ATTORNEY

Patented July 8, 1952

2,602,887

UNITED STATES PATENT OFFICE 2,602,887

RADIO TRANSMITTER

George H. Brown, Princeton, N. J., assignor to Radio Corporation of America, a corporation of Delaware Application October 4, 1948, Serial No. 52,635

12 Claims. (Cl. 250—17)

This invention relates to radio transmitters.

It is known that the limitation of power is a serious obstacle to the transmission of television programs in the bands between 500 megacycles and 900 megacycles. At these ultra high frequencies, the physical dimensions of the circuit elements become very small and make it extremely difficult to parallel vacuum tubes in the conventional manner in order to increase the power output.

The paralleling of vacuum tubes as ordinarily practiced at lower radio frequencies results in the paralleling of tube capacities and the need for low inductances in the form of inconveniently short line sections for resonance tuning. Furthermore, these tubes, when paralleled, interact upon each other and deleteriously affect the operation of the system particularly when one or more of them fails during operation. Tubes presently available for supplying a peak power not greater than three kilowatts at frequencies up to 520 megacycles are unsatisfactory for higher frequencies because of the considerable reduction in power output at frequencies above 520 megacycles.

The present invention provides a radio transmitting system of increased power which overcomes the foregoing difficulties.

An object of the present invention is to increase the power output from a radio system by additively combining power from a plurality of stages feeding a common load, in such manner that the stages operate independently of each other and without deleteriously affecting the bandwidth of the system.

Another object is to enable the paralleling of the effective outputs of independently connected electron discharge device stages for increasing the power output of a transmitter without interaction between stages and without causing the stages to affect the bandwidth to any greater extent than the use of a single stage.

A further object is to enable the transmission of relatively large power (above 500 watts) at ultra high frequencies in the range of 470 to 900 megacycles.

A feature of the invention is the circuit arrangement which permits the paralleling of the effective outputs of a pair of electron discharge device stages, such that the stages operate entirely independently and, in effect, are isolated from each other.

In brief, the heart of the invention comprises a pair of power amplifier stages which are excited from the same radio frequency source and are similarly modulated with the same program material such that each stage operates independently of the other. The modulation occurs only in the stages having bandwidth requirements. The outputs from the two stages are fed to different input terminals of a balanced bridge circuit or network, in turn, provided with both an absorber element and a common load symmetrically coupled to the bridge. A control is provided for enabling a shaft in the phase of the voltage supplied by one stage to the bridge relative to the voltage supplied by the other stage to the bridge. The bridge or network is so constructed and arranged that both outputs from the two stages additively combine to furnish increased power in the common load, with zero or negligible current in the absorber element when both stages are operating, but with decreased power to the common load when only one stage is operating. The system of the invention thus assures output to the common load in the event of failure of any one stage.

Although the invention finds particular usefulness in a television transmitting system operating in the ultra high frequency region over a wide band of frequencies, it should be understood that it is also useful in the lower radio frequency regions and in transmitters requiring a relatively narrow band of frequencies.

A more detailed description of the invention follows, in conjunction with a drawing, wherein.

Figure 1:
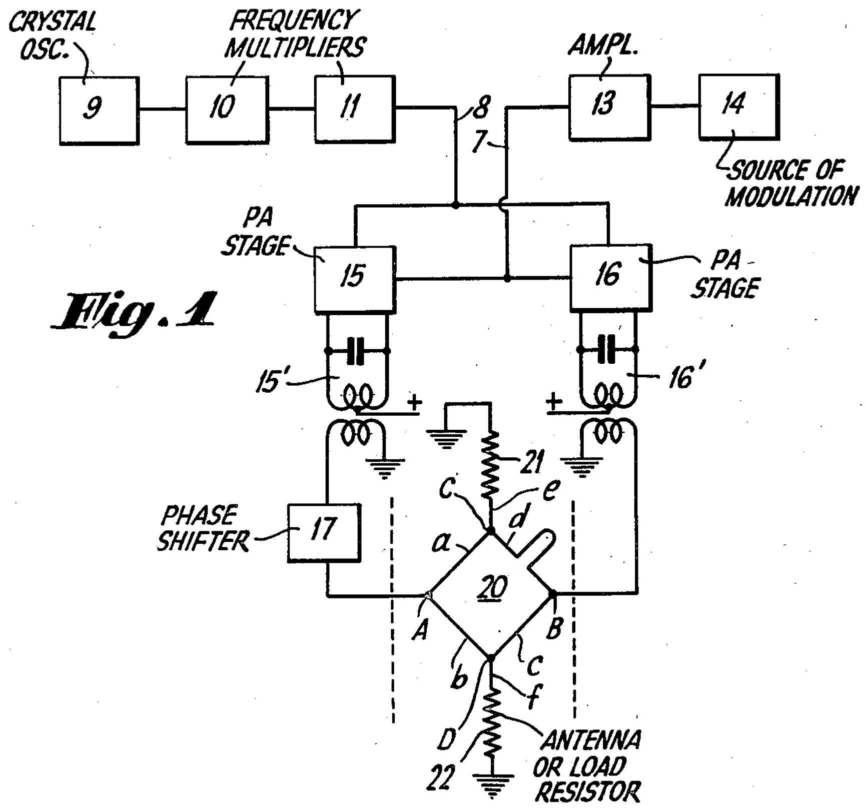
Fig. 1 illustrates one radio transmitter embodiment of the invention.

Referring to the drawing in more detail, Fig. 1 illustrates one embodiment of a transmitter in accordance with the invention which is particularly useful at ultra high frequencies in a system requiring a relatively narrow band of output frequencies. The general principles to be discussed hereinafter are, however, applicable to all embodiments of the invention whether used at ultra high frequencies or at lower radio frequencies and for narrow and wide bandwidths. The system of Fig. 1 shows a pair of electron discharge device power amplifier stages 15 and 16 both excited in common over lead 8 from a common driving source indicated generally as a crystal-controlled oscillation generator 9 through frequency multipliers 10 and 11. The multipliers 10 and 11 may be frequency doublers or frequency triplers to increase the frequency of the carrier generated by oscillator 9. Both power amplifier stages 15 and 16 are the last stages in the radio frequency transmitter and are the only stages having bandwidth requirements. These stages are modulated from a common modulator 14 over amplifier 13 and lead 7. The power amplifier stages 15 and 16 may comprise single tubes or push-pull tubes, and may have their grids, anodes or cathodes coupled to the modulator. If desired, a driver tube may be inserted between each of the power amplifier stages and the common modulator circuit.

The output circuits from the power amplifier stages 15 and 16 are shown as parallel-tuned circuits 15' and 16' respectively, and these are coupled to points A and B symmetrically positioned on a bridge or balanced network 20. A phase shifter 17 is positioned between one of the power amplifiers and the bridge 20 for the purpose of insuring that voltages of equal phase appear at points A and B. Although the phase shifter 17 is shown in circuit with stage 15 it can be alternatively located in the output of stage 16. If desired, a power control network can be inserted between the outputs of both power amplifier stage and points A and B of the bridge 20; if this is done, then the power control network in circuit with that stage having the phase shifter 17 will be positioned between the phase shifter 17 and that power amplifier stage which feeds energy thereto. These power control networks may be simply vernier devices used to insure that the voltages appearing at points A and B are equal. The use of such power control networks is not essential in the practice of the invention even where the voltages supplied to points A and B differ by as much as 20%.

The phase shifter 17 may be any suitable device and preferably an adjustable telescoping coaxial line section so constructed and arranged that there are no electrical discontinuities in the line at the junction of the adjustable telescoping sections. In this way, if the coaxial line of the phase shifter is matched from an impedance standpoint to an associated circuit, any change in effective length of the coaxial line will merely change the phase of the voltage output therefrom and not the amplitude.

Bridge circuit or balancing network 20, shown in Fig. 1 comprises three electrically equal arms *a*, *b* and *c*, each one-quarter wavelength long ($\lambda/4$) at the carrier frequency (mean operating frequency), and a fourth arm *d* having an electrical length equal to three-quarters of a wavelength ($3\lambda/4$) at the carrier frequency. Arm *d*, it should be noted, is provided with a loop to increase its overall length relative to the other arms, while conserving space. Symmetrically coupled to points C and D constituting the junctions of arms *a* and *d*, and *b* and *c* respectively, are lines *e* and *f* which extend respectively to power dissipative elements in the form of an absorbing resistor 21 and a load resistor 22. Resistors 21 and 22, in effect, represent identical loads on the bridge 20 because lines *e* and *f* are made to offer the same impedance to the bridge. Load resistor 22 is illustrative of any suitable output or utilization circuit such as an antenna. In practice, arms *a*, *b* and *c* may be of any suitable electrical length so long as they are electrically equal, and arm *d* may have an electrical length which differs from the other arms by 180° to achieve a neutralizing or bucking action of the current at junction point C, so that no current flows in the absorbing resistor 21 when the voltages at points A and B are exactly equal in magnitude and phase.

Let it be assumed that arms *a*, *b* and *c* are each one-quarter wavelength long ($\lambda/4$) at the mean operating frequency and each having a characteristic impedance of $(\sqrt{2})\ Z_c$, and that arm *d* is three-quarters of a wavelength long ($\frac{3}{4}\lambda$) at the mean operating frequency and has a characteristic impedance of $(\sqrt{2})\ Z_c$. Lines *e* and *f* should then each have a characteristic impedance of $Z_c$ ohms. The impedance at point A will then be $Z_c$ ohms, and the impedance at point B also $Z_c$ ohms. The impedances of the lines *e* and *f* then match the impedance of the bridge 20 at the points of connection thereto. It will be noted that points A, B and C, D are at opposite diagonals of the bridge and are balancing points relative to each other.

In the practice of the invention, it is proposed to so adjust the phase and amplitude of the voltage fed into one point A or B from one power amplifier stage relative to the voltage fed into the other point B or A from the other power amplifier that the net current in the absorber resistor 21 is zero. This zero net current is caused by the bucking or neutralizing action achieved due to the proper selection of the lengths of the various arms of the bridge. The explanation for this action is as follows: If power amplifier stage 15 is operative to deliver power to terminal A and power amplifier 16 inoperative, then current I. will be delivered over arm *b* to the load resistor 22 and also a current I. will be delivered over arm *a* to the absorbing resistor 21. Now if amplifier stage 16 is operative to deliver energy to terminal B and amplifier stage 15 inoperative, then a current I. will be delivered over arm *c* to the load resistor 22 and a current I. will be delivered over arm *d* to the absorbing resistor 21. Consequently, when both power amplifiers 15 and 16 are operating to deliver power to terminals A and B, the current in the load resistor 22 will be twice I., while no current will appear in the absorbing resistor. The result is that there is zero net current flow in absorber resistor 21, and by virtue of the connections to and the arrangement of the bridge circuit, the power amplifiers feeding points A and B are completely independent of each other and thoroughly uncoupled from each other at the carrier frequency.

From a practical standpoint, the magnitude of the voltage supplied by one power amplifier stage to the bridge circuit at, let us say point A, can be substantially different (for example, of the order of 20%) from the magnitude of the voltage supplied by the other power amplifier stage to the bridge circuit at point B, and the power amplifier stages 15 and 16 would still be uncoupled from each other, although in such case there would be a power loss in the absorber resistor of a negligible amount due to the absence of complete neutralization or bucking of the voltages at point C.

In the event of failure of one power amplifier stage, there will be no bucking action in the bridge circuit 20, and the power from the remaining operating stage will divide and flow both into the absorber resistor and the useful load 22, as a result of which one-half of the power from the operating stage will be wasted in the absorber resistor. The net result is that only one-fourth of the power will be delivered to the antenna or useful load compared to that delivered to the antenna when both power amplifier stages are operating. An important advantage in this system of the invention however, is the fact that there is no absolute failure in the system even when one power amplifier stage ceases to operate, and there is no different effect on the bandwidth whether one or both power amplifier stages are operating.

The system of Fig. 1 utilizing the particular bridge circuit 20 is most effective where a relatively narrow band of frequencies is to be transmitted because of the relatively narrow pass band characteristic of the bridge 20. This is because the bridge 20 depends on the phase reversal due to line lengths in the arms thereof to achieve the desired bucking action. Where it is desired to transmit a relatively wide band of frequencies as in a wide band television system operating in the range of 470 megacycles to 900 megacycles, for example, the bridge 20 in Fig. 1 should be replaced by a wide band type of bridge circuit or balancing network, preferably of the type disclosed in Fig. 2 and designated 20'. In the bridge 20' of Fig. 2, the balance is independent of frequency, and the particular line lengths in this bridge 20' are selected to obtain desirable impedances over the range of frequencies. These line lengths in the drawing are expressed in wavelengths at the middle of the selected band. The same reference characters appearing in Figs. 1 and 2 designate the same parts, it being understood that the terminal A in both figures is the point on the balancing network to which the power amplifier stage 15 is coupled through the phase shifter 17, while the terminal B is the point on the balancing network to which the power amplifier stage 16 is coupled. In the interest of simplicity in the drawing, those parts of the transmitter of Fig. 1 which are coupled to the bridge or balancing network are not illustrated in Fig. 2, it being understood that the bridge 20 of Fig. 1 located between the two vertical dash lines can be replaced by the bridge 20' of Fig. 2.

Figure 2:
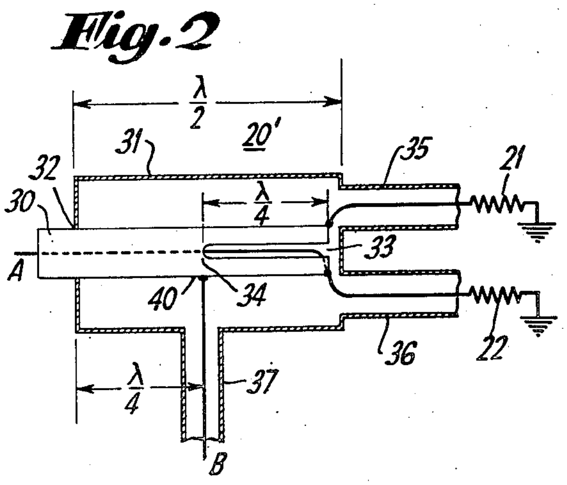
Fig. 2 illustrates a preferred form of bridge or balanced network for use in a television radio transmitter operating at ultra high frequencies over a wide band.

The bridge circuit or balancing network 20' of Fig. 2 includes a coaxial line 30 which is coupled at terminal A to phase shifter 17 and power amplifier stage 15 (note Fig. 1), and another coaxial line 37 which is coupled at terminal B to the other power amplifier stage 16. The inner conductor of line 37 is connected to the outer conductor of line 30 at point 40. A portion of the coaxial line 30 is surrounded by a coaxial sleeve 31 of electrically conductive material. The sleeve 31 is connected at one end to the outer conductor of the line 30 at their junction 32. The end of coaxial line 30 remote from terminal A is provided with a slot 33 extending diametrically across the line 30 and longitudinally down to the point 34. The inner conductor of line 30 passes through the length of the slot and is connected to the outer conductor of line 30 at the free end and at one side of the slot. The absorbing resistor 21 and the useful load resistor 22 (representing the antenna) are connected to opposite sides of the slot 33 through coaxial lines 35 and 36, as shown, and are, in effect, equal resistors or identical loads because they offer the same impedance to the network.

Slot 33 extends longitudinally down the line section 30 one-quarter wavelength at the mean frequency of operation of the system. When current at the mean frequency is supplied to the line 30 by the power amplifier coupled to terminal A, the instantaneous current flow is over the inner conductor of the line 30 to the end of the outer conductor at the lower side of the slot 33.

The two parts of the outer conductor of line 30 separated by the slot 33 cooperate to act as a quarter-wavelength open wire line short-circuited at the point 34. This presents a substantially infinite impedance between the two slotted ends of the outer conductor of line 30 and effectively prevents any of the current from the inner conductor from flowing down the outer conductor. Thus if a current I is flowing along the line 30 from the terminal A, the same current I flows into the load resistor 22.

The current I flowing along the inner conductor of the line 30 from terminal A is balanced by an equal current returning down the inside of the outer conductor of the line 30. This current flows through the absorbing resistor 21 to the upper slotted end of the outer conductor of the line 30. Owing to the high impedance across the open end of the slot, all of this current flows down inside the upper portion of the outer conductor, spreading over the interior surface of the outer conductor of the line section 30 below the slot 33. Thus the absorbing resistor 21 and the load resistor 22 are energized in phase opposition or push-pull by the power amplifier coupled to the terminal A.

At frequencies other than that at which the slot 33 is exactly one-quarter wavelength long, some of the current flowing from terminal A along the inner conductor of line 30 flows down the inside of the lower portion of the outer conductor. This induces a current tending to flow toward the right in the upper portion, reducing the total current which flows from the absorbing resistor 21 to its point of connection. Thus the currents to the absorbing resistor 21 and the load resistor 22 remain equal to each other, but they are no longer the same as that flowing along the line 30 from terminal A. The net effect is somewhat similar to that of shunting the source coupled to the terminal A by the reactance of the parallel wire line section formed by the two end portions of the outer conductor of the line 30.

The outer conductor of the line section 30 cooperates with the sleeve 31 to function as a coaxial line section short-circuited at the end 32. Current from the power amplifier coupled to the terminal B is applied to this line section at the point 40. This current induces a voltage along the outside of the outer conductor of the line section 30 by auto-transformer action. The voltage to ground from both arms of the outer conductor is the same. Thus the voltage between the ends of the outer conductor is zero, and no current is induced in the line to terminal A by the power amplifier coupled to the terminal B.

Since the two ends of the outer conductor of the line 30 are at the same voltage with respect to ground, equal currents flow from them through the absorbing resistor 21 and the load resistor 22. These currents are in phase with each other. None of the current from the terminal A flows on the outside of the outer conductor of that portion of the line 30 within sleeve 31, so no current is induced in the power amplifier coupled to terminal B by the power amplifier coupled to terminal A. Thus both the absorbing resistor 21 and the load resistor 22 are energized by each power amplifier without interaction.

For a more detailed description of the general principles of operation of the particular balancing network or bridge circuit illustrated in Fig. 2, reference is made to my copending application, Serial No. 630,073, filed November 21, 1945, now U. S. 2,454,907 granted November 30, 1948.

Figure 3:
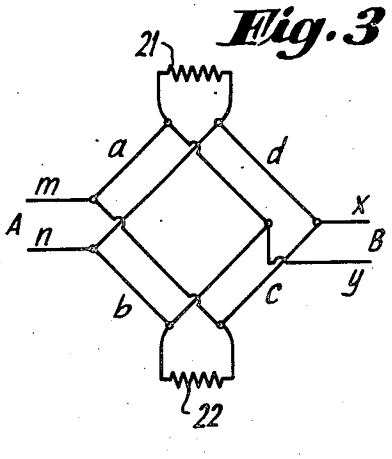
Fig. 3 illustrates another bridge or balanced network which can be used to replace the bridges of Figs. 1 and 2 for some conditions of operation.

Fig. 3 illustrates another kind of bridge circuit or balanced network which can be used to replace the bridge 20 or bridge 20′ in the system of Fig. 1, in practicing the invention. The terminals A and B in Fig. 3 represent those points on the bridge to which the power amplifiers 15 and 16 are respectively coupled, in the manner illustrated in Fig. 1. In effect, the bridge of Fig. 3 utilizes parallel wire lines for arms *a*, *b*, *c* and *d* with a transposition in arm *d* to achieve the neutralization or bucking action in the absorbing resistor. Each arm in Fig. 3 can thus be equal, electrically, to one-quarter wavelength ($\lambda/4$) long at the mean operation frequency. Either resistor 21 or 22 may be the absorbing resistor depending upon the relative polarities on the wires of terminals A and B. Thus if wires *m* and *n* are positive and negative, respectively, and wires *x* and *y* are also positive and negative, respectively, then resistor 21 is the absorbing resistor. However, if *m* and *n* are positive and negative respectively, and *x* and *y* are negative and positive respectively, then resistor 22 is the absorbing resistor.

Figure 4:
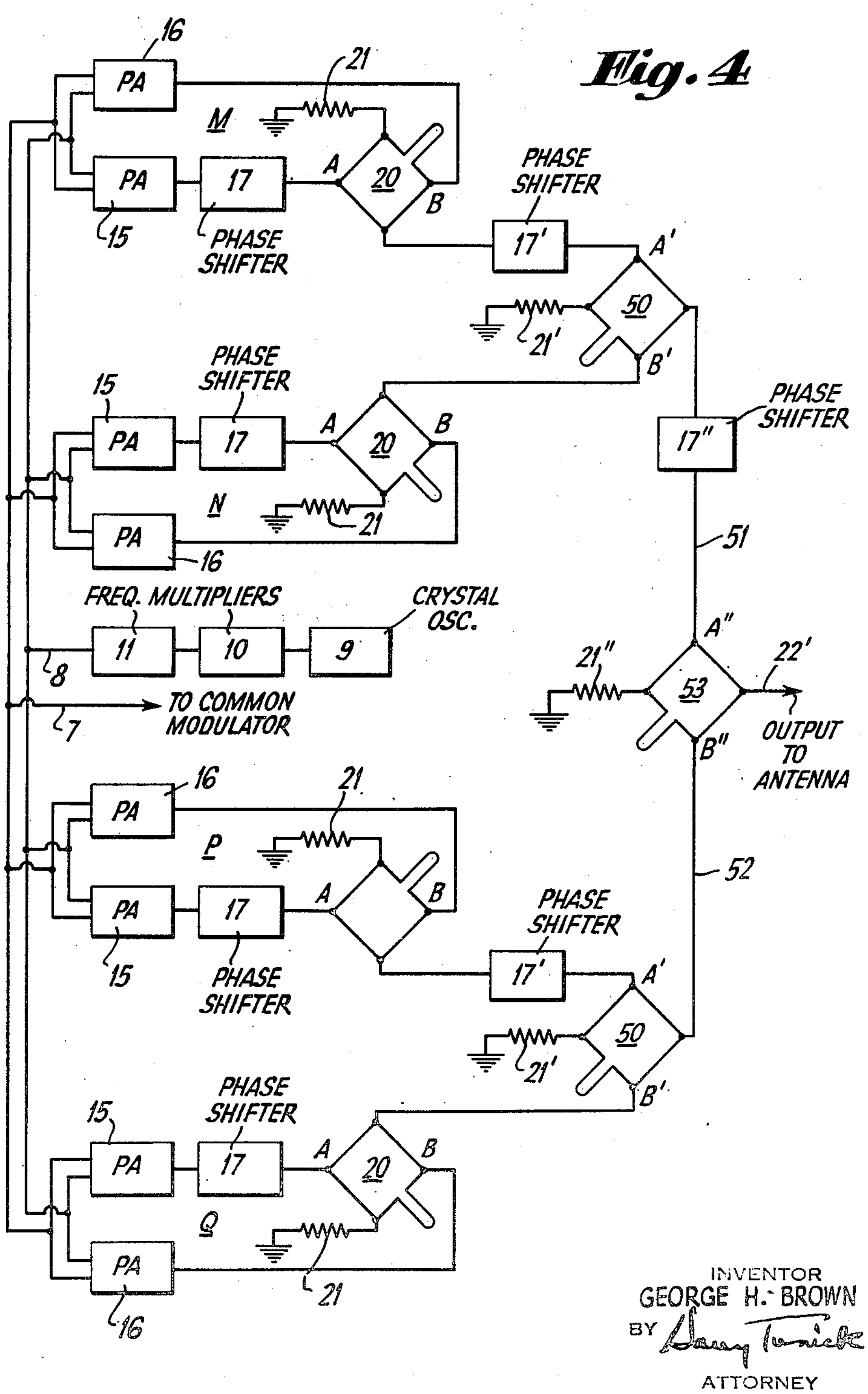
Fig. 4 illustrates a radio transmitting system in which the outputs of several different paralleled stages of the type generally illustrated in Fig. 1 are combined in a common load.

Fig. 4 illustrates a radio transmitting system in which several circuits each including two paralleled power amplifier stages are further combined or paralleled to still further increase the power in a common load or utilization circuit, such as an antenna, without any interaction between individual circuits or between the power amplifier stages in the same circuit. The output of each circuit comprising two paralleled power amplifier stages is treated in Fig. 4 as a single source of radio frequency energy. The same general principles of operation are employed in the system in Fig. 4 as in Fig. 1. The same or equivalent parts in both of these figures have been given the same reference characters.

More specifically, the system of Fig. 4 includes four circuits M, N, P and Q each of which comprises two final power amplifier stages 15 and 16 supplying power to terminals A and B respectively, of the bridge or balanced network 20. In circuit with the output of one power amplifier stage, let us say 15, is the phase shifter 17 for enabling voltages of equal phase to be supplied to terminals A and B. The parallel tuned circuits in the outputs of the power amplifier stages 15 and 16 and the coils to which they are coupled have not been shown in the interest of simplification of the drawing, but follow generally the illustration of Fig. 1. The absorbing resistor in circuit with each bridge or balanced network is designated 21.

The power amplifier stages 15 and 16 of all circuits M, N, P and Q are excited from the same radio frequency source and are similarly modulated with the same program material to the same degree. The common driving radio frequency source is a crystal-controlled oscillation generator 9 which feeds a pair of cascaded frequency multipliers 10 and 11, in turn, coupled over lead 8 to all circuits M, N, P and Q. The power amplifier stages are modulated from a common modulator over lead 7. The power amplifier stages in the different circuits are modulated to the same degree and rise and fall together.

The output leads from the bridges or balanced networks in circuits M and N are fed to terminals A′ and B′ of a bridge or balanced network 50 of a construction similar to bridge 20. A phase shifter 17′ is inserted in the output of one of the circuits M to insure the delivery of equal phase voltages to terminals A′ and B′. Bridge 50 is provided with an absorbing resistor 21′ and with a load or utilizing circuit in the same manner as the bridge 20 in the individual circuits M, N, P and Q. In a similar manner the output leads from the bridges in circuits P and Q are fed to terminals A′ and B′ of another bridge 50, as shown.

The outputs from the two bridges 50 are fed over leads 51 and 52 to points A″, B″ on a bridge 53 whose construction is similar to that of bridge 20. A phase shifter 17″ serves to insure equal phase voltages applied to the terminals A″ and B″. An absorbing resistor 21″ and a utilization circuit or load designated 22′ represent equal loads applied to the bridge 53. The lead 22′ extends to the antenna of the transmitter system.

If desired, power control networks may be inserted in the output circuits of the power amplifier stages and in the leads extending between the different bridge circuits.

Figures 5, 6:
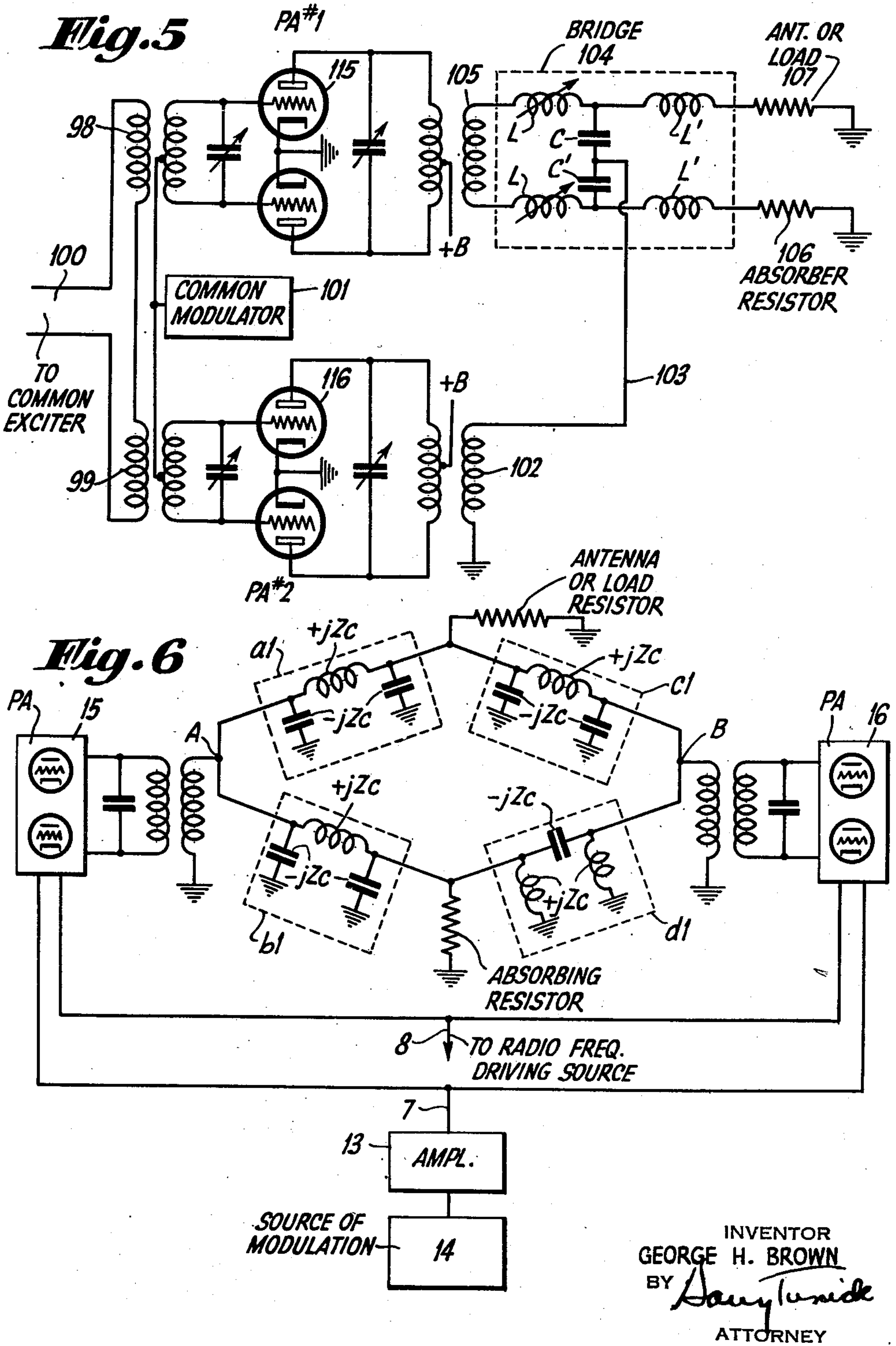
Fig. 5 illustrates another radio transmitter embodiment of the invention useful at the lower radio frequencies where lumped circuits can be employed.
Fig. 6 illustrates a bridge or balanced network in the form of artificial lines, which can be used in the transmitter of the invention.

The principles of the invention are applicable to systems operating in the lower radio frequencies wherever lumped circuits may be employed; for example 1 to 15 megacycles. One such transmitting system embodying the principles of the invention is illustrated in Fig. 5. This figure illustrates two final power amplifier stages 115 and 116 both driven or excited from a common radio frequency source over leads 100, and both coupled to a common modulator 101. This common modulator modulates the carrier fed to the power amplifier stages to the same extent. The input and output circuits of each power amplifier stage are parallel tuned circuits. The input circuits are coupled to coils 98 and 99 arranged in series and fed via leads 100 from the common exciter which may include a crystal-controlled oscillator followed by neutralized amplifiers.

In circuit with the outputs of the power amplifier stages is a bridge or balanced network 104 indicated within a box. This bridge comprises four arms in the form of coils L, L, L′ and L′, with the junctions of the coils L, L′ in both sides of the bridge connected to opposite sides of a capacitor formed of two equal condensers C, C. The electrical center of this capacitor is coupled to the output of stage 116 over lead 103 and coil 102. Stage 115 is coupled to the bridge by means of coil 105. An absorber resistor 106 and a load resistor 107, representing an antenna or utilization circuit, are also coupled to the bridge, as shown.

It will thus be seen that power amplifier stage 115 provides push-pull voltages on the bridge 104 while power amplifier 116 provides voltages in parallel to both sides of the bridge 104 by virtue of the connection to the electrical center of capacitor C, C. In one side of the bridge having arms L and L', the voltages add, while in the other side of the bridge having arms L and L' the voltages buck. The inductors L, L are variable to provide a phase shift control for shifting the phase of output from one power amplifier stage relative to the output from the other power amplifier stage. The resistors 106 and 107 represent equal loads on the bridge.

Fig. 6 illustrates another radio transmitter embodiment of the invention in which artificial line sections are employed in the bridge or balancing network. This system is useful where it is desirable to have both power amplifier stages 15 and 16 operate unbalanced to ground. The bridge employs three arms *a1*, *b1* and *c1*, shown in dotted line boxes, which constitute lagging networks serving to retard or shift the current and voltage therein by 90 degrees. The arm *d1*, also shown in a dotted line box, constitutes a leading network which serves to advance or shift the current and voltage therein by 90 degrees. Each phase retarding network comprises a serially arranged coil shunted by condensers, while the phase advancing network comprises a serially arranged capacitor shunted by coils. The electrical characteristics of the components in the different arms are indicated by the different formulae + or $-jZ_c$, in which $$\frac{1}{wc}=Z_c$$

in ohms and $wl$ also equals $Z_c$ in ohms.

The power amplifier stages 15 and 16 are excited from a common source of radio frequency constituting the carrier, shown connected to lead 8, and similarly modulated by a common modulator to the same degree by a source of modulation 14 working through an amplifier 13, and over lead 7. No phase shifter has been shown between the power amplifier stages and the bridge, although it will be understood that such a phase shifter is desirable to insure equal phases in the voltages applied by the two stages to points A and B on the bridge. If desired, a power control network can be used between a power amplifier stage and the bridge to equalize the magnitude of the voltages supplied to points A and B.

Figure 7:
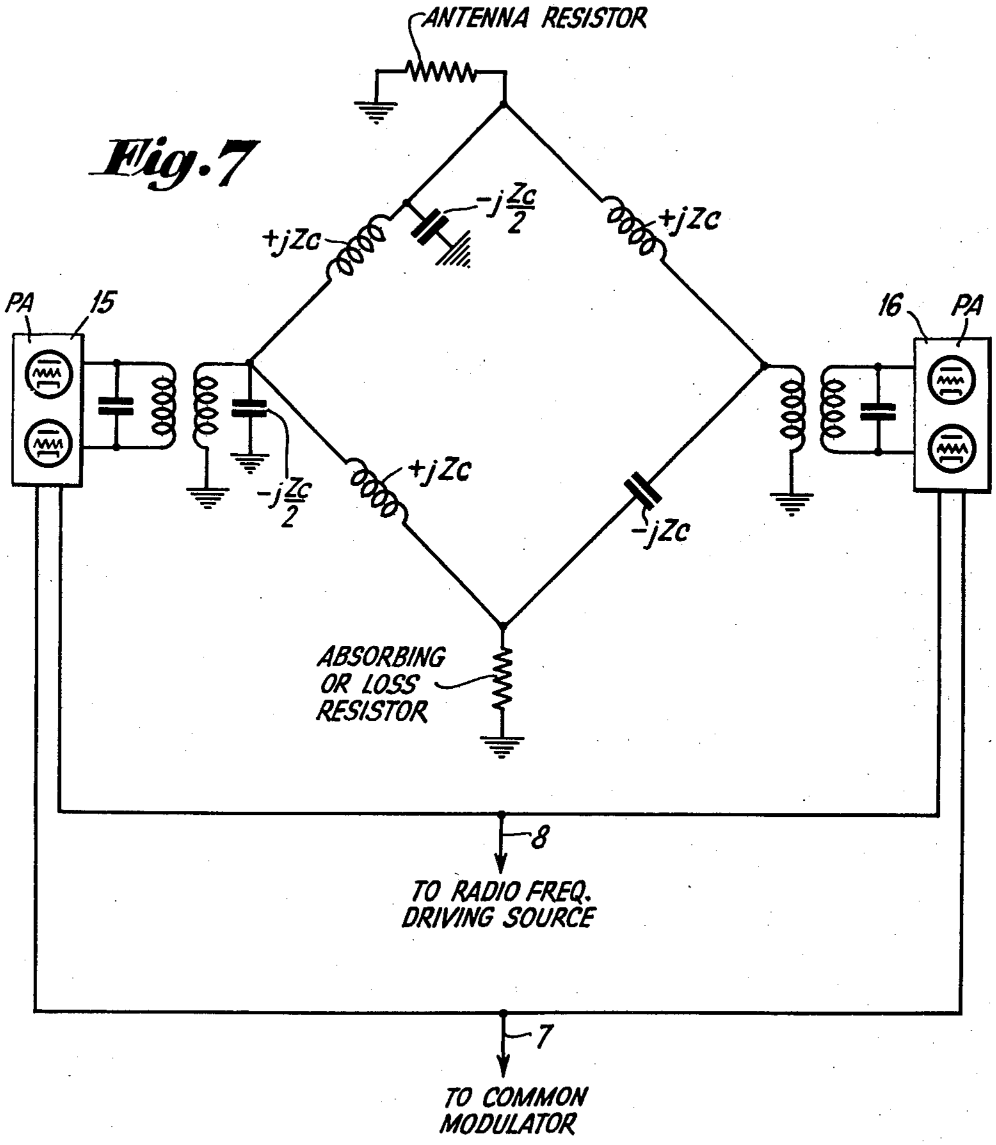
Fig. 7 shows a practical construction of the bridge or balanced network of Fig. 6 with an absolute minimum of circuit components.

Fig. 7 illustrates a simplification of the system of Fig. 6, employing a minimum of components in the arms of the bridge, because adjacent components in the arms of Fig. 6 can be replaced by a single component of selected value as indicated on Fig. 7. By way of explanation, in Fig. 6 the condenser $-jZ_c$ in arm *b1* and the adjacent coil $+jZ_c$ in arm *d1*, taken together, become infinite in impedance and can both be eliminated. This also applies to the coil $+jZ_c$ in arm *d1* which is adjacent the condenser $-jZ_c$ in arm *c1*. The condenser $-jZ_c$ adjacently located in arms *a1* and *b1* taken together become $-jZ_c/2$ and can be replaced by a single condenser. This also applies to the two condensers $-jZ_c$ adjacent each other in arms *a1* and *c1*.

It will thus be seen that various types of bridge or balanced networks can be employed in the practice of the present invention. The term "bridge" used in the description and in the appended claims is deemed to include any network having two sets of feed terminals A and B (in effect two input terminals) such that when voltage is applied to one set A or B no voltage appears at the other set B or A when the elements of the network have been properly selected.

What is claimed is:

1. In a radio transmitter, a pair of power output stages, a common exciter source of carrier frequency coupled to both stages, a common modulator coupled to both stages for modulating said stages similarly to the same degree, a bridge circuit having two sets of feed terminals, an absorber element and a load coupled to points on said bridge circuit symmetrically positioned relative to said two sets of feed terminals, the connections from said absorber element and said load to said points offering the same impedance to said bridge, a coupling between the output of one of said stages and one set of feed terminals, a coupling between the output of the other of said stages and the other set of feed terminals, and means for controlling the relative phases of the voltages fed to said bridge circuit.

2. In a radio transmitter, a pair of power amplifier stages, means for exciting both power amplifier stages with the same carrier frequency, a common modulator coupled to both stages for similarly modulating said carrier in both stages, a balanced network having two spaced input connections, two power dissipative elements in the form of a loss resistor and a load coupled symmetrically to spaced points on said network through connections offering the same impedance to said network, a circuit coupling the output of one amplifier stage to one of said spaced input connections, a circuit including a phase shifter coupling the output of the other amplifier stage to the other input connection, both of said last circuits offering the same impedance to said balanced network, said network having components of such selected electrical values so arranged that said stages operate entirely independently of each other without interaction, and the net current flow in said loss resistor is negligible when voltages of equal phase and substantially equal magnitude are fed by said stages into said input connections.

3. A radio transmitting system comprising a pair of power amplifier stages each having a parallel tuned output circuit, a stable frequency oscillator coupled to both of said stages through one or more frequency multipliers, whereby both of said stages are excited with the same carrier frequency, a common modulator coupled to both stages for modulating said carrier similarly in both stages, a bridge circuit having first, second and third arms each one-quarter wavelength long and a fourth arm three-quarters of a wavelength long at the means operating frequency, a circuit coupling the parallel tuned output of one stage to the junction of said first and second arms, a circuit coupling the parallel tuned output of the other stage to the junction of said third and fourth arms, means for equalizing the phases of the voltages supplied to said bridge by said last two coupling circuits, a power dissipative element coupled to the junction of said second and fourth arms, and a load coupled to the junction of said first and third arms, said last two couplings offering the same impedance to said bridge.

4. A wide band television radio transmitting system comprising a pair of power amplifier stages each having a parallel tuned output circuit, a stable frequency oscillator coupled to both of said stages through one or more frequency multipliers, whereby both of said stages are excited with the same carrier frequency, a common modulator coupled to both stages for modulating said carrier similarly in both stages, a balanced network comprising a first coaxial input line, a conductive sleeve surrounding one end of said line and connected to the outer conductor of said line at a point near said end, the end portion of said line including a longitudinal slot, the end of the inner conductor of said line being connected to the end of the outer conductor at one side only of said slot, a second coaxial input line with its outer conductor connected to said sleeve and its inner conductor coupled to the outer conductor of said first input line within said sleeve, and a pair of coaxial output lines offering the same impedance to said balanced network with their outer conductors connected to said sleeve and their inner conductors connected to the end of the outer conductor of said first input line on opposite sides of said slot, means for feeding the output of one power amplifier stage to the first coaxial input line, means for feeding the output of the other power amplifier stage to the second coaxial input line, a power dissipative element coupled to one of said coaxial output lines, and a useful load coupled to the other of said coaxial output lines.

5. A radio transmitter as defined in claim 1, wherein said bridge includes arms having lumped circuit elements incorporated therein.

6. A radio transmitter as defined in claim 1, wherein said bridge contains four arms which are electrically equal and each made up of parallel wire lines, that arm which is located between said absorber element and the point of coupling to one of said stages being transposed relative to that arm which is located between said load and said point.

7. In a radio transmitter, a pair of power output stages, a common exciter source of carrier frequency coupled to both stages, a common modulator coupled to both stages for modulating said stages similarly to the same degree, a bridge circuit comprising first and second coil arms in series forming one side of the bridge and third and fourth coil arms in series forming the other side of the bridge, said first and third coils being electrically equal to each other, and said second and fourth arms being electrically equal to each other, a capacitor joining the junction of said first and second arms to the junction of said third and fourth arms, said capacitor having plates oppositely disposed relative to an electrical center point therein, means coupling the output of one power amplifier stage to terminals of first and third coils removed from capacitor, means coupling the output of said other power amplifier stage to the electrical center of said capacitor, whereby said one stage provides push-pull voltages to both sides of said bridge and said other stage provides voltages in parallel to both sides of said bridge, and a pair of power dissipative elements coupled to said second and fourth arms and offering equal impedances to said bridge.

8. A radio transmitter as defined in claim 7, characterized in this, that said first and third coil arms of said bridge are variable to control the phase of output supplied to said bridge by said one stage.

9. In a radio transmitter, a pair of power output stages, a bridge circuit having two input lines, a power absorbing element and an output line coupled to points on said bridge symmetrically positioned relative to said two input lines, the connections from said absorbing element and said output line to said points offering the same impedance to said bridge, a coupling between the output of one of said stages and one input line, a coupling between the output of the other stage and the other input line, means for controlling the relative phases of the voltages fed to said input lines, another similar arrangement of a pair of power output stages and a bridge circuit, a common carrier exciter source coupled to both pairs of power output stages, a common modulator coupled to both pairs of power output stages for modulating the stages in each pair similarly to the same degree, a third bridge circuit for combining the outputs from said first and second bridges, said third bridge circuit having a pair of input lines coupled to the output lines of said first two bridges, said third bridge having an absorbing element and an output line coupled to points on said third bridge symmetrically positioned relative to the input lines to said third bridge, the connections from said last absorbing element and said last output line offering the same impedance to said the bridge, and means for varying the phase of the voltage supplied to one input line of said third bridge relative to the voltage fed to the other input line of said third bridge.

10. In a radio transmitter system, a plurality of similar electrical circuit arrangements of pairs of power output stages and bridge circuits therefor, constituting a total of an even number of said electrical circuit arrangements, each arrangement comprising: a pair of output stages, a bridge circuit having two input lines, a power absorbing element and an output line coupled to points on said bridge circuit symmetrically positioned relative to said two input lines, the connections from said absorbing element and said output line to said points offering the same impedance to said bridge, a coupling between the output of one of said stages and one input line, a coupling between the output of the other stage and the other input line, means for controlling the relative phases of the voltages fed to said input lines; in combination with a common carrier exciter source similarly coupled to the inputs of all pairs of output stages in said electrical circuit arrangements, a common modulator coupled to all pairs of power output stages in said electrical circuit for modulating the stages in each arrangement similarly to the same degree, a bridge circuit for combining the outputs of each two electrical circuit arrangements, and bridge means for combining the combined outputs from said last bridge circuits; the total number of output stages in all arrangements being an even number, while the total number of bridges in said system required to combine the outputs of the stages in all arrangements being one less than the total number of output stages.

11. In a radio transmitter, a pair of power output stages, a common exciter source of carrier frequency coupled to both stages, a common modulator coupled to both stages for modulating said stages similarly to the same degree, a bridge circuit comprising first and second coil arms in series forming one side of the bridge and third and fourth coil arms in series forming the other side of the bridge, said first and third coils being electrically equal to each other, and said second and fourth arms being electrically equal to each other, a capacitor joining the junction of said first and second arms to the junction of said third and fourth arms, said capacitor having plates oppositely disposed relative to an electrical center point therein, an inductor connected between those terminals of the first and third coils removed from said capacitor, means for inductively coupling the output of one power amplifier stage to said inductor, means coupling the output of said other power amplifier stage to the electrical center of said capacitor, whereby said one stage provides push-pull voltages to both sides of said bridge and said other stage provides voltages in parallel to both sides of said bridge, and a pair of power dissipative elements coupled to said second and fourth arms and offering equal impedances to said bridge.

12. A television radio transmitter comprising a pair of power amplifier output electron discharge device stages, each of said stages having a tuned output circuit, means for exciting both of said stages in parallel substantially to the same extent with a carrier frequency in the range of approximately 470 to 900 megacycles, means for supplying the same program modulation material to both of said stages in similar manner, a bridge circuit having two sets of feed terminals, an absorber element and an antenna coupled to different points on said bridge circuit symmetrically positioned relative to said two sets of feed terminals, the connections from said absorber element and said antenna to said points offering the same impedance to said bridge, a coupling between the output of one of said stages and one set of feed terminals, a coupling between the output of the other of said stages and the other set of feed terminals and a phase shifter in one of said last couplings for controlling the relative phases of the voltage fed to said bridge circuit.

GEORGE H. BROWN.

REFERENCES CITED

The following references are of record in the file of this patent:

UNITED STATES PATENTS

| Number | Name | Date |
|---|---|---|
| 2,244,756 | Alford | June 10, 1941 |
| 2,280,282 | Colchester et al. | Apr. 21, 1942 |
| 2,283,897 | Alford | May 26, 1942 |
| 2,369,589 | Maddock | Feb. 13, 1945 |
| 2,416,790 | Barrow | Mar. 4, 1947 |
| 2,454,907 | Brown | Nov. 30, 1948 |
| 2,534,624 | Posthumus | Dec. 19, 1950 |